United States Patent [19]
Dietrich et al.

[11] 3,988,268

[45] Oct. 26, 1976

[54] POLYURETHANE FOAM PLASTICS WHICH CONTAIN IONIC GROUPS

[75] Inventors: Werner Dietrich; Helmut Reiff, both of Cologne; Dieter Dieterich, Leverkusen, all of Germany

[73] Assignee: Bayer Aktiengesellschaft, Leverkusen, Germany

[22] Filed: Oct. 11, 1974

[21] Appl. No.: 514,034

Related U.S. Application Data

[63] Continuation of Ser. No. 330,893, Feb. 9, 1973, abandoned.

[30] Foreign Application Priority Data

Feb. 17, 1972 Germany............................ 2207350

[52] U.S. Cl. ..................... 260/2.5 AN; 260/2.5 AD; 260/2.5 AM; 260/2.5 AQ; 260/2.5 AR; 260/77.5 Q

[51] Int. Cl.² ........................................... C08J 9/06

[58] Field of Search .............. 260/77.5 Q, 2.5 AD, 260/2.5 AM, 2.5 AG, 2.5 AQ, 2.5 AR, 2.5 AN

[56] References Cited
UNITED STATES PATENTS

| | | |
|---|---|---|
| 2,938,005 | 5/1960 | Bick ............................ 260/2.5 AG |
| 2,990,378 | 6/1961 | Hurwitz......................... 260/2.5 AD |
| 3,053,778 | 9/1962 | Toone........................... 260/2.5 BB |
| 3,087,900 | 4/1963 | Brown............................ 260/2.5 BB |
| 3,087,901 | 4/1963 | Brown............................ 260/2.5 BB |
| 3,120,849 | 2/1964 | Guttag.......................... 260/2.5 AM |
| 3,326,823 | 6/1967 | Landler......................... 260/2.5 AD |
| 3,388,081 | 6/1968 | Merten.......................... 260/2.5 AD |
| 3,451,954 | 6/1969 | Sambeth ........................ 260/2.5 AD |
| 3,511,814 | 5/1970 | Ogura............................ 260/2.5 AM |
| 3,586,648 | 6/1971 | Sambeth ........................ 260/2.5 AD |
| 3,629,162 | 12/1971 | Richardson.................... 260/2.5 AM |
| 3,644,237 | 2/1972 | Crawford....................... 260/2.5 AM |

FOREIGN PATENTS OR APPLICATIONS

| | | | |
|---|---|---|---|
| 1,168,070 | 4/1964 | Germany........................ 260/2.5 AD |
| 6,802,620 | 8/1968 | Netherlands.................... 260/77.5 Q |
| 1,045,175 | 10/1966 | United Kingdom............ 260/2.5 AQ |
| 933,713 | 8/1963 | United Kingdom............ 260/2.5 AQ |

*Primary Examiner*—Eugene C. Rzucidlo
*Attorney, Agent, or Firm*—Joseph C. Gil; Gene Harsh

[57] ABSTRACT

The invention relates to polyurethane foam plastics having a density of from about 7 to about 100 kg/m³ which contain from about 0.1 to about 5 mVal/g of mobile ions consisting of cations and/or anions. The polyurethane foams are suitable as ion exchange media or as substrate for the propagation and cultivation of plants.

1 Claim, 4 Drawing Figures

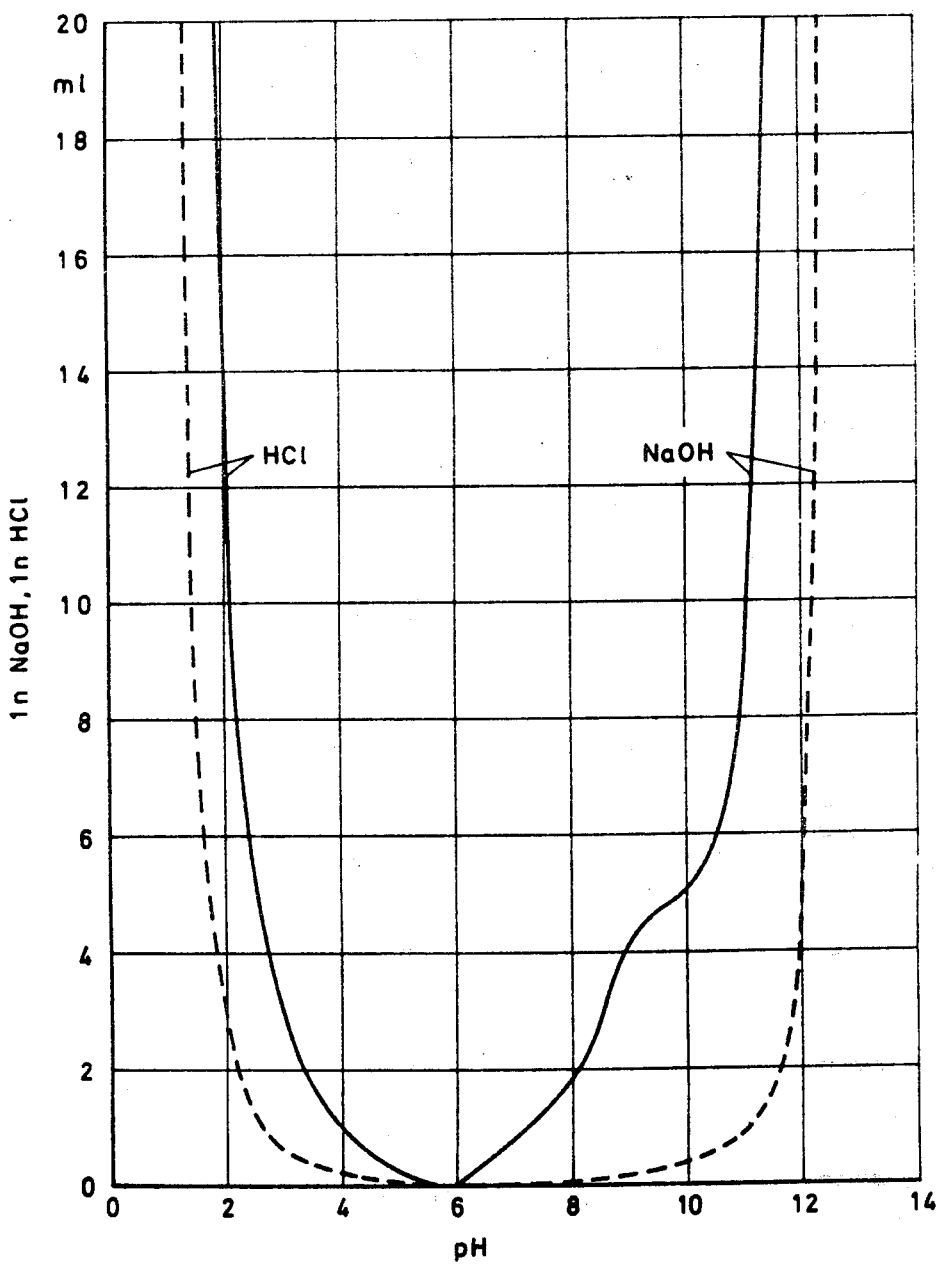
FIG. I

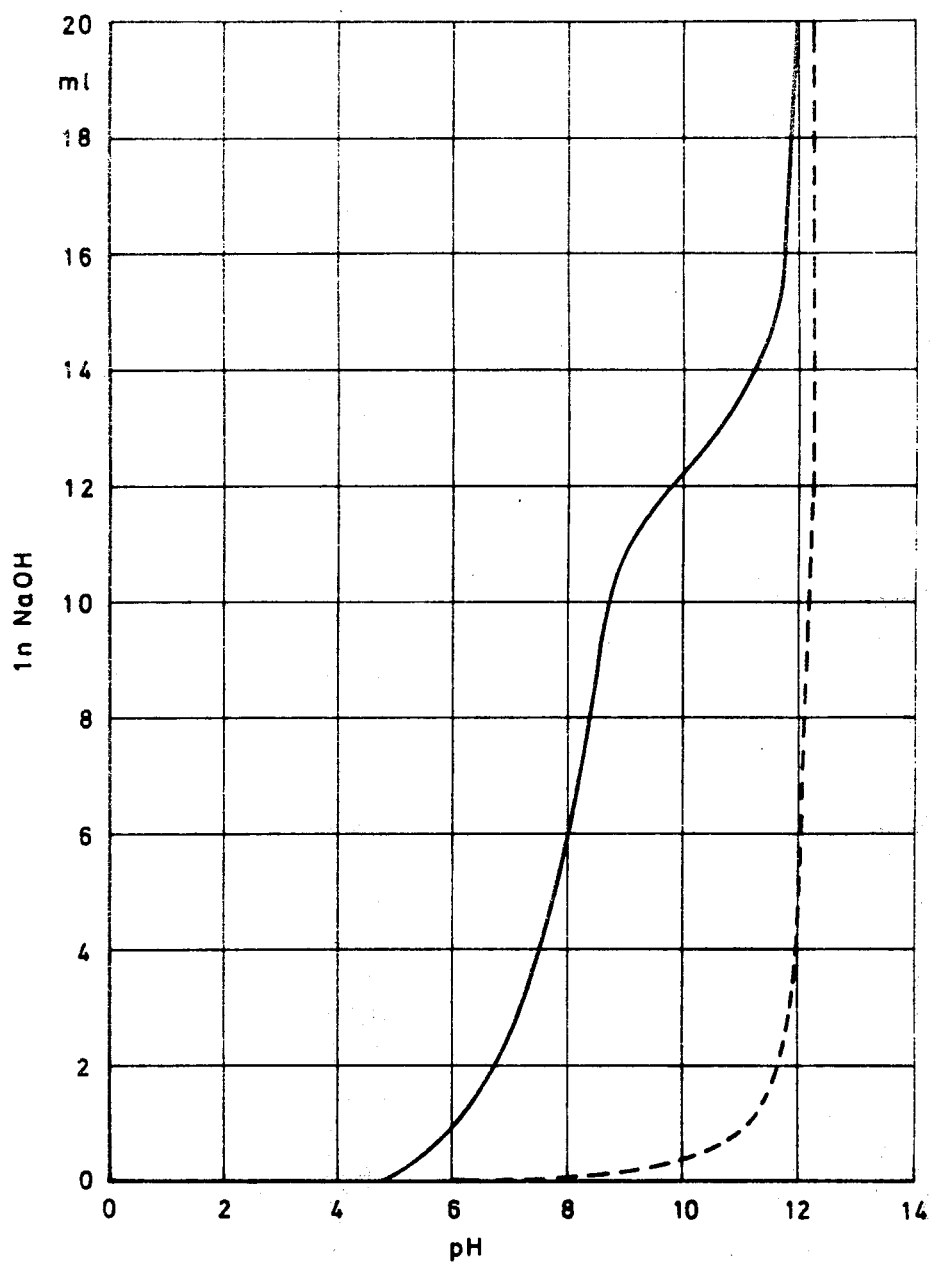
FIG. II

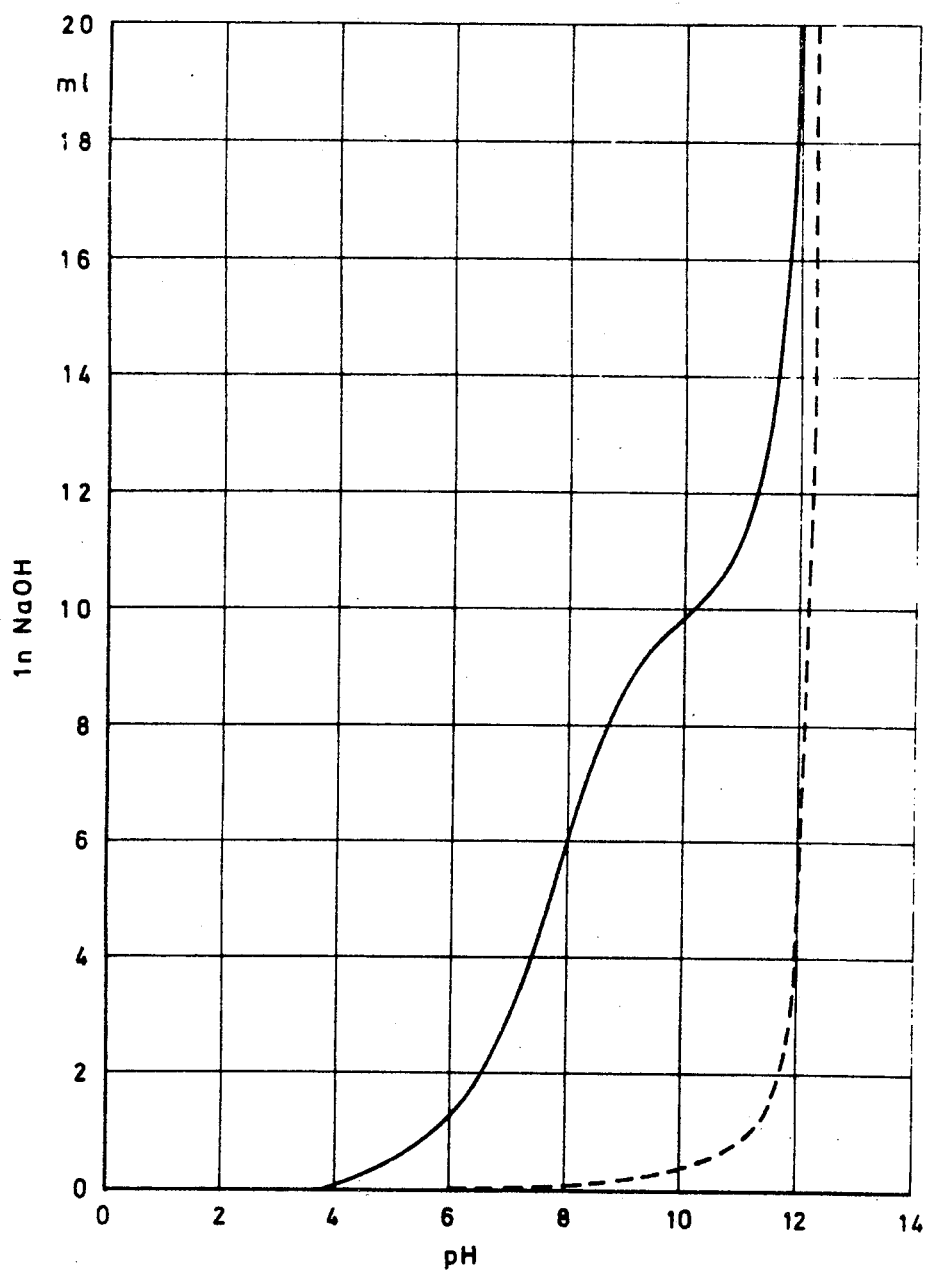
FIG. III

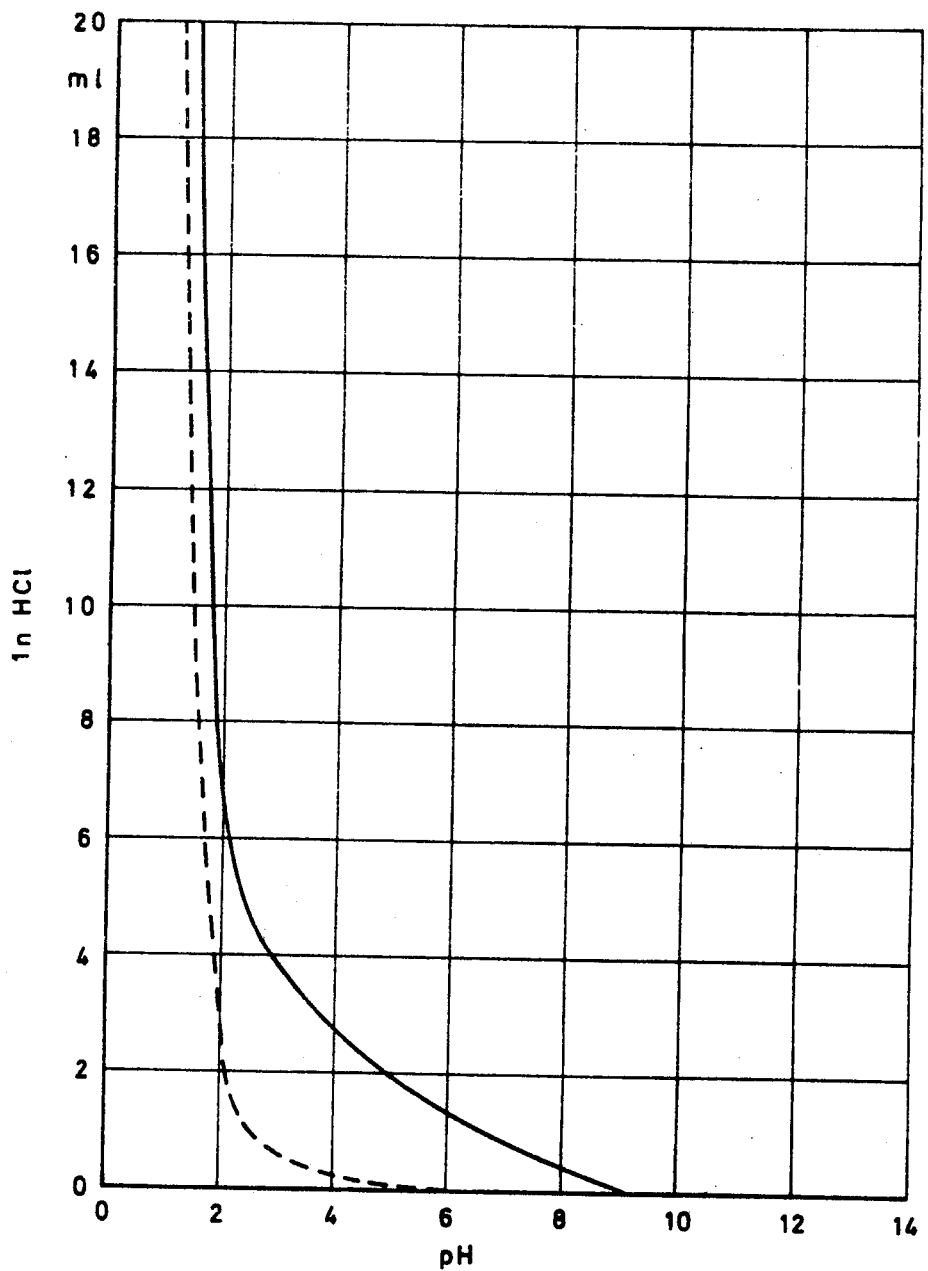
FIG. IV

POLYURETHANE FOAM PLASTICS WHICH CONTAIN IONIC GROUPS

This is a continuation, of application Ser. No. 330,893, filed Feb. 9, 1973, now abandoned.

This invention relates to polyurethane plastics and more particularly to polyurethane foam plastics that contain ionic groups and to a process for the production thereof.

It is known to produce polyurethane foam plastics from polyols and polyisocyanates with the optional addition of water and/or other blowing agents, activators, stabilizers and other auxiliary agents. By suitable selection of the individual components and of the concentration of blowing agents, it is possible to obtain foam plastics with a variety of mechanical properties and densities.

It is also known to use foam plastics as plant substrates. For this purpose it is preferable to use foam plastics which are sufficiently hydrophilic to insure an adequate supply of moisture to the roots.

The difficulty of raising plants in foam plastic substrates lies in supplying the plants with the necessary quantity of fertilizers and in particular of inorganic nutrient salts. Although this difficulty can be partly overcome by spraying the foam plastics in which the plants have been embedded with a solution of nutrient salt, it is still difficult to maintain the optimum salt concentration over any considerable period of time.

In addition, there remains the fundamental problem of imparting to synthetic plant substrates the buffering function which is inherent in natural soils.

According to U.S. Pat. No. 2,988,441, the plants are supplied with the necessary nutrients and adequate buffering capacity is insured by adding to the reaction mixture for the polyurethane foam, ion exchange resins in the form of powders or granulates which are charged with nutrient salts. The disadvantage of this method is that the addition of macroscopic fillers to the polyurethane foam reaction mixture entails mechanical difficulties. Moreover, disturbances in the cell structure of the foams usually occur when macroscopic fillers are distributed in the reaction mixture. A further disadvantage is the fact that homogeneous distribution of these fillers in all zones of the completed foam plastic cannot always be insured.

According to U.s. Pat. No. 3,232,739, the only substances which can be incorporated in the polyurethane foam without the difficulties mentioned above are urea and its derivatives which, as organic substances, are soluble in some of the polyols used for preparing polyurethane foams. Even so, since urea contains acidic hydrogen, it is liable to react with the isocyanates in the foaming process in such a way that is becomes built into the molecular structure so that its continuous supply as a fertilizer is jeopardized.

A process has now surprisingly been found by which it is possible to produce polyurethane foam plastics containing ionic centers which are chemically built into the foam structure and on which suitable ions of opposite charge can be fixed ionically. These ions of opposite charges are freely mobile in the foam structure because they are attached only by heteropolar bonds. These foam plastics are eminently suitable not only as ion exchangers but, if ion of opposite charge are used to promote and insure plant growth, also as soil-free substrates for raising and cultivating plants. Another field of application of these foam plastics is the physical and chemical improvement of soil. The principle of the new process is based on the reaction of organic polyisocyanates with compounds which contain both hydrogen atoms which are reactive with isocyanate groups and ionic groups which are combined with suitable ions of opposite charge. Instead of these last-mentioned compounds, compounds which contain hydrogen atoms which are reactive with isocyanate groups and groups which can be converted into ionic groups may be used in this process. In the latter case, introduction of the ionic groups into the foam is carried out by an after-treatment with an aqueous solution which contains the appropriate ions of opposite charge. One feature which is particularly surprising is that cationic and anionic components can be foamed together without any difficulty to give rise to a macroampholyte.

This invention thus provides a process for the production of polyurethane foam plastics which have a density of from about 7 to about 100 kg/m$^3$ and contain from about 0.1 to about 5 mVal/g of mobile ions comprising reacting organic polyisocyanates, compounds containing hydrogen atoms which are reactive with isocyanate groups, conventional auxiliary agents and additives, wherein from about 5 to about 100% by weight of the total quantity of compounds containing hydrogen atoms which are reactive with isocyanate groups consist of:

a. Compounds which in addition to the groups which are reactive with isocyanate groups contain ionic groups in combination with ionically bound ions of opposite charge, or b. compounds containing groups which can be converted into ionic groups. In the latter case, reaction with the polyisocyanate is followed by at least partial conversion of the said convertible groups into ionic groups by treatment with an aqueous solution which contains the appropriate ions of opposite charge.

Particularly interesting products of the process according to the invention are the amphoteric foam plastics which are obtained from reactants which contain both cationic and anionic groups because these foam plastics are particularly suitable for use as substrates for the soil-free raising and cultivation of plants.

This invention also provides polyurethane foam plastics having a density of from about 7 to about 100 kg/m$^3$ which contain from about 0.1 to about 5 mVal/g of mobile ions consisting of from about 20 to about 80% by weight of cations and from about 80 to about 20% by weight of anions.

Polyurethane foam plastics produced by the process according to the invention with purely anionic or purely cationic compounds containing hydrogen atoms which are reactive with isocyanate groups are particularly suitable for use as substrates for the soil-free raising and cultivation of plants or they may also be used as ion exchange resins or for physical and chemical soil improvement.

This invention therefore also relates to the use of polyurethane foam plastics obtained by the process according to the invention as substrates for soil-free raising and cultivation of plants, as ion exchange resins and for physical and chemical soil improvement.

The foam plastics obtained by the process according to the invention have an excellent ion exchange capacity which not only provides a depot effect, that is to say the mobile ions of opposite charge are delivered only slowly and as required and also produces a considerable buffering effect due to the capacity of the polyurethane matrix to bind $H^{(+)}$ ions and/or $^{(-)}$ ions.

The capacity and function of binding ions can be adjusted as desired by suitable choice of the individual components and their concentrations. If required, the products may attain the capacity of commercial ion-exchangers.

The process of the invention has the further advantage that ion exchangers with any degree of acidity or basicity can be obtained by suitable choice of the ionic center in the polyurethane matrix.

Furthermore, the hydrophilic character, the proportion of open cells and the size of the cells in the foam plastics obtained by the process according to the invention can be adjusted as desired by suitable choice of the starting components. The rate of ion exchange increases as the hydrophilic character, proportion of open cells and size of cells of the products increase.

There are three main methods available for carrying out the process of the invention:

1. Salts of the following general structure are used in the reaction:

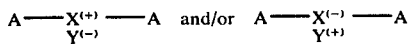

wherein
    A represents a group which is reactive with isocyanates,
    X represents the anionic or cationic center which is bound in the polyurethane matrix subsequently formed, and
    Y represents the mobile ion of opposite charge.

A polyurethane foam with ion exchange capacity which is already charged with salts is obtained by this method.

2. The reaction is carried out using a mixture of
    a. substances of the following structure:

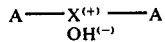

wherein
    A represents the center which is reactive with isocyanate groups and
    X represents the bound ionic center or a group capable of being converted into an ionic center, and
    b. organic and/or inorganic acids, bases or neutral salts which are either dissolved in water or suspended in the reaction mixture and which constitute the mobile ions of opposite charge in the finished polyurethane foam. The salts are obtained in situ by method 1. The product obtained in this case is again a polyurethane foam with ion exchange capacity which is already charged with salts.

3. The reaction is carried out with substances having the following general structure:

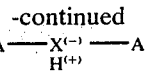

in which
    A again represents the center which is reactive with isocyanate groups, and
    X represents the bound ionic center or a group capable of being converted into an ionic center. After the reaction, the foam is in this case charged with an aqueous solution of inorganic or organic acids, bases and/or neutral salts. The finished ionic foam is thus obtained only by subsequent treatment of the foam after its formation.

The structures indicated under (1) to (3) are represented for the sake of simplicity as divalent with respect to A and monovalent with respect to X but in practice they could equally well be mono- or polyvalent both with respect to A and with respect to X.

The first method is the simplest of the three methods represented above and therefore also preferred. According to a particularly preferred embodiment of the method represented under (1), the mixtures of

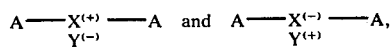

used, in which A, X and Y have the meanings indicated above, are so chosen that the finished foam product contains both free mobile anions and free mobile cations, the total quantity of free mobile ions consisting of from about 20% to about 80% by weight of cations and from about 80% to about 20% by weight of anions. This provides the capability of supplying the plants with both anions and cations which promote and/or secure plant growth. In addition, such foams are capable of buffering both against $H^{(+)}$ ions and against $OH^{(-)}$ ions. This buffering action is particularly pronounced if the mobile ions have a strong basicity or acidity while the fixed ions have only a weak acidity or basicity. Such a buffering action is of the greatest importance to plant physiology. On the one hand it is capable of virtually preventing over-acidification of the substrate by the acid compounds excreted by the plant roots and on the other hand any rise in pH which is liable to occur especially if the plants are sprayed with hard water is greatly attenuated.

The following compounds and their salts may be used according to the invention as compounds which contain both hydrogen atoms which are reactive with isocyanate groups and ionic centers or groups which are capable of being converted into ionic centers.

1. Aliphatic, cycloaliphatic, aromatic and heterocyclic mono- and diaminocarboxylic acids such as for example glycine, α- and β-alanine, 6-aminocaproic acid, 4-aminobutyric acid, sarcosine, methionine, leucine, isoleucine, serine, valine, ornithine, histidine, lysine, proline, phenylalanine, threonine, cysteine, asparagine, glutamine, arginine, aspartic acid, glutamic acid, oxaluric acid, anilido-acetic acid, anthranilic acid, 2-ethylaminobenzoic acid, 3-aminobenzoic acid, 4-aminobenzoic acid, N-phenylamino-acetic acid, 3,4-diaminobenzoic acid, 5-aminobenzene-dicarboxylic acid, β-amino-ethyl-β-alanine, aminohexyl-β-alanine and the like. The preferred aminocarboxylic acids are those containing 2 to 8 carbon atoms, 1 or 2 amino groups and 1 or 2 carboxyl groups.

2. Mono-, di or polyhydroxyl mono-, di- or polycarboxylic acids such as, for example, tartaric acid, malic acid, citric acid, dimethylolpropionic acid, dimethylolbutyric acid, dimethylolhexanoic acid, pentaerythritolmonocarboxylic acid, pentaerythritoldicarboxylic acid, itamalic acid and the like. The preferred hydrocarboxylic acids are those containing 2 to 8 carbon atoms, 1 to 4 hydroxyl groups and 1 to 4 carboxyl groups.

3. Aliphatic, cycloaliphatic, aromatic and heterocyclic mono-, di- or polyaminosulphonic acids of disulphonic acids, such as for example, amidosulphonic acid, hydroxylamine monosulphonic acid, hydrazine disulphonic acid, sulphanilic acid, N-phenylaminomethanesulphonic acid, 4,6-dichloroaniline-sulphonic acid-(2), phenylenediamine-(1,3)-disulphonic acid-(4,6), N-acetylnaphthylamine-(1)-sulphonic acid-(3), naphthylamine-(1)-sulphonic acid, (naphthylamine-(1)-sulphonic acid) naphthylamine-(2)-sulphonic acid, naphthylamine-disulphonic acid, naphthylamine trisulphonic acid, 4,4′-di-(p-aminobenzoyl-amino)-diphenyl-urea-disulphonic acid-(3,3′), phenyl hydrazinedisulphonic acid-(2,5), 2,3-dimethyl-4-amino-azobenzene-disulphonic acid-(4,5), 4′-aminostilbene-disulphonic acid-(2,2′)-4-azo-4-anisole, carbazoledisulphonic acid-(2,7), taurine, methyltaurine, butyltaurine, 3-aminobenzoic acid-(1)-sulphonic acid-(5), 3-aminotoluene-N-methanesulphonic acid, 6-nitro-1,3-dimethylbenzene-4-sulphamic acid, 4,6-diaminobenzene-disulphonic acid-(1,3), 2,4-diaminotoluene-sulphonic acid-(5), 4,4′-diamino-diphenyl-disulphonic acid-(2,2′), 2-aminophenolsulphonic acid-(4), 4,4′-diamino-diphenyl-ether-sulphonic acid-(2), 2-aminoanisole-N-methane-sulphonic acid, 2-aminodiphenylaminesulphonic acid, 2,4-diaminobenzene-sulphonic acid and the like. The preferred aminosulphonic acids are those containing 1 to 8 carbon atoms, one or two amino groups and 1 or 2 sulphonic acid groups.

4. Hydroxy-, mercapto- and carboxy-sulphonic acids, such as for example, 2-mercaptoethanesulphonic acid, 3-hydroxypropane sulphonic acid, 2-hydroxyethanesulphonic acid, phenol-2-sulphonic acid, phenol-3-sulphonic acid, phenol-4-sulphonic acid, phenol-2,4-disulphonic acid, sulphoacetic acid, m-sulphobenzoic acid, p-sulphobenzoic acid, 3,5-disulphobenzoic acid, 2-chloro-4-sulpho-benzoic acid, 2-hydroxy-5-sulphobenzoic acid and the like. The preferred hydroxy-, mercapto- and carboxysulphonic acids are those containing 1 to 8 carbon atoms, 1 or 2 hydroxyl, mercapto or carboxyl groups and 1 or 2 sulphonic acid groups.

5. Organic acids of phosphorus which contain amino, hydroxyl or mercapto groups, such as for example, bis-(α-hydroxyisopropyl)phosphinic acid, hydroxyalkanephosphonic acids, bis-glycol esters of phosphorus acid, bis-propyleneglycol esters of phosphorus acid, phosphoric acid, bis-glycol esters of phosphoric acid, bis-propylene glycol esters of phosphoric acid, aminoalkanephosphonic acids, mercaptoalkanephosphonic acids and the like.

6. Also suitable are addition products (optionally saponified) of unsaturated acids such as acrylic acid and methacrylic acid and unsaturated nitriles such as acrylonitrile; of cyclic dicarboxylic acid anhydrides such as maleic, phthalic and succinic acid anhydride; of sulphocarboxylic acid anhydrides such as sulphoacetic acid and o-sulphobenzoic acid anhydride; the addition products of reaction products of olefines with sulphur trioxide such as carbylsulphate, of epoxycarboxylic and epoxysulphonic acids such as glycidic acid or 2,3-epoxy propanesulphonic acid, or disulphonic acid anhydrides such as benzene-1,2-disulphonic acid anhydride with aliphatic and aromatic amines as ethylene-1,2-diamine, hexamethylene-1,6-diamine, the isomeric phenylenediamines, diethylene triamine, ethylene tetramine, tetraethylene-pentamine or pentaethylene hexamine; optionally alkylated hydrazines ammonia, amino alcohols, hydroxyalkylated amines and hydrazines such as ethanolamine, diethanolamine, triethanolamine, ethanolethylenediamine, ethanol hydrazine and alcohols such as ethylene glycol, propylene glycol, 1,3- and 1,4-butanediol and 1,6-hexanediol; polyhydric alcohols such such as trimethylolpropane, glycerol and hexanetril; addition products (optionally hydrogenated) of epoxy and ethyleneimine compounds such as ethylene oxide, propylene oxide, butylene oxide, styrene oxide, ethylene imine and unsaturated nitriles such as acrylonitrile with aliphatic and aromatic amino carboxylic acids and aminosulphonic acids; the reaction products of hydroxyalkanesulphonic acids, halocarboxylic acids and halosulphonic acids with optionally alkylated hydrazines such as hydrazinoacetic acid, hydrazinoethane-sulphonic acid or hydrazinomethane-sulphonic acid; saponified addition products of cyanhydrins with hydrazines such as 1,2-hydrazine-bis-isobutyric acid, oleyl diethanol-amine and polyfunctional polyamines the individual amino groups of which may differ in their basicity, for example, polyamines which have been obtained by the hydrogenation of addition products of acrylonitrile with primary and secondary amines, peralkylated or partly alkylated polyamines such as N,N-dimethylethylenediamine; compounds such as α-aminopyridine and N,N-dimethylhydrazine; the addition products of sodium bisulphite with olefinically unsaturated compounds such as allyl alcohol, methyl allyl alcohol, ethyl allyl alcohol, etc., maleic acid, bis-ethyleneglycol esters of maleic acid and bis-propyleneglycol esters of maleic acid. Hydrazinocarboxylic acids such as hydrazinodicarboxylic acid are also suitable.

The following compounds and their salts are preferred components for use in the process of the invention:

7. Polyester polyols containing carboxyl or sulphonic acid groups with a molecular weight preferably below 1500 and in particular below 800 which may be prepared, for example, by condensation of the polyhydroxycarboxylic acids mentioned under 2. or their salts with polycarboxylic acids such as adipic acid or phthalic acid or by condensation of polyhydroxysulphonic acids such as 1,5-dihydroxypentanesulphonic acid or bis-(2-hydroxy-ethoxy)-benzene sulphonic acids and the like with polycarboxylic acids such as adipic acid or phthalic acid and the like. Preparation of polyester polyols containing carboxyl groups or sulphonic acid groups which are suitable for the process according to the invention may also be carried out by polycondensation of higher functional alcohols such as ethylene glycol, propylene glycol, butylene glycol, glycerol or trimethylene propane with polycarboxylic acids such as adipic acid or phthalic acid with the addition of monohydroxycarboxylic acids or monohydroxysulphonic acids such as hydroxy acetic acid, 3-hydroxypropionic acid, 4-hydroxybutyric acid, 2-hydroxyethanesulphonic acid, trihydroxyethanesulphonic acid and the like. Polyester polyols containing carboxylic or sulphonic acid groups and their salts which are suitable for the process of the invention have been described, e.g., in Belgian Patent Specification No. 688,299.

8. Reaction products of higher functional alcohols which have a molecular weight of up to about 250, such as for example, glycerol, trimethylolpropane, trimethylolethane, pentaerythritol, etc., with aliphatic or aromatic dicarboxylic acid anhydrides such as maleic acid anhydride, succinic acid anhydride, phthalic acid anhydride, glutaric acid anhydride, tetrahydrophthalic acid anhydride, hexahydrophthalic acid anhydride, endomethylene tetrahydrophthalic acid anhydride 4-methyl-tetrahydrophthalic acid anhydride, endomethylene-hexachloro-tetrahydrophthalic acid anhydride, tetrachlorophthalic acid anhydride or trimellitic acid anhydride, using an equivalent ratio of hydroxyl groups to carboxylic acid anhydride groups of preferably between about 1:0.2 and 1:0.8.

9. Polyether esters which contain hydroxyl groups and have a molecular weight of preferably less than 1500 and more particularly below 800 which may be obtained by reacting alkoxylated higher valent alcohols, such as for example, glycerol, trimethylolpropane, trimethylolethane, pentaerythritol, and the like with aliphatic or aromatic dicarboxylic acid anhydrides such as maleic acid anhydride, succinic acid anhydride, phthalic acid anhydride or trimellitic acid anhydride, using a proportion of hydroxyl groups to acid anhydrides groups of preferably between about 1:0.2 and 1:0.8.

10. Hydroxypolyethers which contain tertiary amino groups and have a molecular weight of preferably below 1500 and particularly below 1200, which may be obtained by reacting alkylene oxides such as ethylene oxide, propylene oxide, butylene oxide, styrene oxide, oxetanes or tetrahydrofurans or mixtures of such alkylene oxides with primary or secondary amines or with aminoalcohols. Suitable primary or secondary amines or amino alcohols are for example, aliphatic, araliphatic, aromatic and cycloaliphatic primary amines such as methylamine, ethylamine, aniline, cyclohexylamine, benzylamine or ammonia; bis-secondary amines such as N,N'-dimethylethylene diamine, piperazine, 4,4'-dimethylamino-diphenylmethane; primary polyamines such as methylene diamines, diethylene triamine, triethylene tetramine, propylene diamine or hydrazine; amino alcohols, such as for example, ethanolamine, diethanolamine, triethanolamine or N,N'-dimethyl-N,N'-bis-2-hydroxy-propylethylene diamine and the like.

The compounds mentioned under paragraphs 7. to 10. provide particularly advantageous results on account of their close relationship to the polyester and polyether polyols known in polyurethane chemistry and are therefore preferred for the process according to the invention. The compounds mentioned under paragraph 9. which contain both ether and ester groups are particularly advantageous.

In addition to the compounds mentioned by way of example in paragraphs 1. to 10., which contain hydrogen atoms which are reactive with isocyanate groups, there may also be used known polyhydroxyl compounds of the type which have been described for example in Saunders-Frisch, "Polyurethanes, Chemistry and Technology", Volumes I and II, Interscience Publishers 1962 and 1964 (page 32f Volume I and pages 5 and 198f in Volume II) and in Kunststoff-Handbuch, Volume VII, Viewing-Hochtlen, Carl-Hanser-Verlag, Munich, 1966, for example, pages 45–71. Epoxy resins, hydrogenation products of ethylene-, olefine- and carbon monoxide-copolymers and phenol-formaldehyde as well as urea-formaldehyde resins which have been reacted with alkylene oxides may also be used. A certain proportion of low molecular weight polyhydroxyl compounds, such as those already mentioned above and/or chain lenghtening agents such as glycols, diamines or water, aldimines and ketimines may also be included.

Preferably, however, the compounds mentioned in paragraphs 1. to 10. are used as the only compounds which contain hydrogen atoms that are reactive with isocyanate groups and ionic centers or groups which can be converted into ionic centers. The following are examples of compounds which are suitable for converting the groups of compounds mentioned in 1. to 10. into the salt form:

a. organic bases such as monofunctional primary, secondary and tertiary amines, for example methylamine, diethylamine, triethylamine, dimethylamine, ethylamine, tributylamine, pyridine, aniline, toluidine, alkoxylatediamines such as ethanolamine, diethanolamine, triethanolamine, methyldiethanolamine, dimethylaminoethanol and the like;

b. inorganic bases, compounds which are basic in reaction or split off bases such as ammonia, monovalent or higher valent metal hydroxides, carbonates and oxides such as sodium hydroxide, potassium hydroxide, calcium carbonate, magnesium carbonate and the like;

c. mineral acids such as nitric acid, phosphorus acid, phosphoric acid, hydrochloric acid, sulphuric acid and the like or any mixtures thereof;

d. organic acids such as acetic acid, tartaric acid, citric acid, dimethylolpropionic acid and the like.

If desired, a combination of various salt-forming agents may be used. Furthermore, the carboxylic or sulphonic acid groups may be only partly neutralized and tertiary amino groups may be only partly protonized or quaternized. If the foam plastics produced by the process according to the invention are to be used as substrates for the soil-free cultivation of plants, they are advantageously charged with ions of opposite charge which promote and secure plant growth. The most important of these ions are those which provide the elements potassium, nitrogen and phosphorus which are essential for feeding plants. These may be introduced into the foam in the form of potassium, nitrate, ammonium or dihydrogen phosphate ions. The foam plastics obtained by the process according to the invention may be charged with sulphate, calcium or magnesium ions or with ions of the trace elements iron, manganese, zinc, nickel, copper, chlorine, boron and molybdenum.

The foam plastics obtained by the process according to the invention may also be charged with ionic organic compounds which promote and regulate plant growth.

The isocyanate compounds used in the process according to the invention may be any aliphatic, cycloaliphatic, araliphatic or aromatic polyisocyanates such as for example, 1-methylbenzene-2,4-diisocyanate, 1-methylbenzene-2,6-diisocyanate and commercial mixtures thereof, arylene diisocyanates and their alkylation products, m- and p-phenylenediisocyanate, naphthylene diisocyanates, diphenylmethane diisocyanates, di- and tri-isopropylbenzene diisocyanates, triphenylmethane-triisocyanate, thiophosphoric acid tri-(p- isocyanatophenyl) ester, phosphoric acid tri-(p-isocyanatophenyl) ester, aralkyl diisocyanates such as 1-(isocyanatophenyl)-ethyl isocyanate, m- and p-xylene diisocyanate, alkylene diisocyanates such as tetra- and hexamethylene diisocyanate, 1-methylcyclohexyl-2,4-diisocyanate and its isomers, α,α-diisocyanatocarboxylic acid esters, 1-isocyanato-3-(isocyanatomethyl)-3,5,5-trimethylcyclohexane as well as polyisocyanates substituted with various substituents such as alkoxy groups, nitro- groups, chlorine or bromine.

It is preferred, however, to use those polyisocyanates in which between about 1 and about 45% of the NCO groups present have already reacted with compounds which contain at least one active hydrogen atom. The following may be mentioned as examples:

Solutions in monomeric diisocyanates of polyisocyanates which contain urethane, allophanate and urea groups; Solutions of urethane polyisocyanates in monomeric isocyanates which may be obtained by reacting a polyfunctional hydroxyl compound with polyisocyanates using an NCO/OH ratio of between 2:1 and 20:1, preferably between 3:1 and 5:1, at temperatures of 0° to 100° C., preferably 50° to 90° C.; Solutions of polyisocyanates containing allophanate groups prepared according to German Patent Application No. P 2 127 504; Solutions of polyisocyanates containing urea groups in monomeric isocyanates prepared according to German Offenlegungsschrift No. 2,032,547 and German Patent Application No. P 2 101 110; Particularly suitable are solutions of isocyanurate polyisocyanates prepared according to German Offenlegungsschrift No. 1,929,034 and solutions of carbodiimide and/or uretdione imine polyisocyanates in monomeric isocyanates prepared according to German Offenlegungsschrift No. 1,568,501.

About 1% to about 90% solutions of biuret polyisocyanates in monomeric isocyanates which are free from biuret groups are particularly advantageous and may be prepared in known manner, for example, by the methods described in German Patents No. 1,101,394; 1,110,859; 1,165,580; 1,215,365; 1,230,778; 1,229,067; 1,227,003, 1,227,004; 1,174,759 and 1,174,760 and in Belgian Patent No. 721,031. It is particularly advantageous to employ the method of preparation described in German Patent Application P 1,924,302, 8 according to which diisocyanates and polyisocyanates are reacted with water with the aid of an emulsifying agent. This method is generally carried out by adding 0.1 to 2 parts by weight (calculated for 100 parts by weight of isocyanate) of a non-iongenic emulsifier, e.g., ricinic polyethyleneglycol ether with OH number 50, to the isocyanate with stirring, then adding the calculated quantity of water dropwise at 60° to 95° C. with stirring and then heating the resulting suspension at 150° to 170° C. for 1 to 3 hours. Homogeneous polyisocyanate mixtures with elevated NCO functionality and elevated viscosity which are stable in storage are obtained by this method.

Biuret polyisocyanates may be prepared by reacting the appropriate diisocyanates and polyisocyanates with particular amines, for example, secondary mono-, di- or polyamines or aromatic diamines with attenuated nucleophilic character, for example, 3,5-diamino-4-chlorobenzoic acid methyl ester and the like.

The modified polyisocyanates which are preferably used are polyisocyanates which contain urethane groups, allophanate groups, biuret groups, isocyanurate groups or uretdione imine groups and have the advantage over unmodified isocyanates of having a greater affinity for hydrophilic polyols and particularly for the polyhydroxyl compounds with salt-type groups which are used in the process of the invention.

In addition to the compounds which contain both groups which are reactive with isocyanates and ionic centers or groups capable of conversion into ionic centers, up to about 95% but preferably not more than about 80% of compounds which contain hydroxyl groups may be used for the production of the foam plastics. This means that from about 5% to about 100% by weight and preferably from about 20% to about 80% by weight of the total quantity of compounds which are reactive with isocyanates consist of compounds which contain ionic groups or groups capable of being converted into ionic groups.

The polyhydroxyl compounds used are generally those which have a molecular weight of 100 to 3,500, such as polyhydroxylic polyesters, polyethers, polythioethers, polyacetals, polycarbonates and polyester amides of the kind commonly used for producing both cellular and non-cellular polyurethanes. Suitable hydroxypolyesters are for example, the wide variety of reaction products of polyhydric alcohols with polybasic carboxylic acids. Instead of free carboxylic acids, however, the corresponding polycarboxylic acid anhydrides, polycarboxylic acid esters or mixtures of these compounds may be used for preparing the hydroxypolyesters. The polycarboxylic acids may be aliphatic, cycloaliphatic, aromatic or heterocyclic compounds and they may be substituted and/or unsaturated. The following are mentioned as specific examples: Succinic acid, adipic acid, sebacic acid, phthalic acid, isophthalic acid, phthalic acid anhydride, maleic acid, maleic acid anhydride monomeric, dimeric and trimeric fatty acids, dimethylterephthalate and the like. The following are examples of polyol components: Ethylene glycol, propylene-1,3-glycol, butylene-1,4-glycol, butylene-2,3-glycol, glycerol, trimethylolpropane, hexane-1,2,6-triol, butane-1,2,4-triol, trimethylolethane, pentaerythritol, mannitol and sorbitol, methyl glycoside, polyethyleneglycols, polypropyleneglycols and polybutylene glycols.

The hydroxypolyethers used are also known per se and may be prepared for example, by the polymerization of epoxides such as ethylene oxide, propylene oxide, butylene oxide, styrene oxide or epichlorohydrin, optionally using starting components which contain reactive hydrogen atoms such as alcohols for example, glycerol, trimethylolpropane or ethylene glycol. Sucrose polyethers may be used according to the invention.

Representatives of the polyhydroxyl compounds which may be used for the invention have been described, for example, in Saunders-Frisch, "Polyurethanes, Chemistry and Technology," Volumes I and II, Interscience Publishers 1962 and 1964 (page 32 et seq. Volume I and page 5 and page 198 et seq. Volume II) and in Kunststoff-Handbuch, Volume VII, Vieweg-Hochtlen, Carl-Hanser-Verlag, Munich 1966, at pages 45 to 71. Epoxy resins, hydrogenation products of copolymers of ethylene, olefine and carbon monoxide, and phenol formaldehyde or urea formaldehyde resins which have been reacted with alkylene oxides may also be used. A certain proportion of low molecular weight polyhydroxyl compounds such as those already mentioned above and/or chain lengthening agents such as glycols, diamines or water, aldimines and ketimines may also be included.

It is preferred, however, to use only compounds which contain both reactive centers and ionic centers or groups capable of conversion into ionic centers because maximum exchange capacity is obtained in this way.

The formulation and molecular weights of the polyols and isocyanates used for the process according to the invention should be so adjusted as to result in from about 0.1 to about 5 mVal/g and preferably from about 0.2 to about 2 mVal/g, of mobile ions attached to immobile ionic centers built into the polyurethane structure. This means that the quantity of components which contain both hydrogen atoms that are reactive with isocyanate groups and ionic groups or groups capable of conversion into ionic groups must be so calculated that the finished foam contains from about 0.1 to about 5 mVal/g or preferably from about 0.2 to about 2 mVal/g.

Other blowing agents as well as water or aqueous salt solutions may be used, such as alkanes, haloalkanes or low boiling solvents in general, for example, methylene chloride, monofluorotrichloromethane, difluorodichloromethane, acetone, methyl formate and the like. Compounds which split off gases at elevated temperatures such as azo compounds or diurethanes of bissemiacetals obtained from 2 mols of formaldehyde and 1 mol of ethylene glycol may also be used as blowing agents.

The polyurethane foam plastics according to the invention may be very flame resistant if they contain a high proportion of inorganic salts although other flame retarding agents may also be added if required.

Numerous suitable flame-retarding substances, usually containing phosphorus and halogens, are known in the art. Compounds of antimony, bismuth or boron are also suitable. A survey of known, efficient flame-retarding agents may be found in the chapter entitled "Flammhemmende Substanzen" on pages 110 – 111 of Kunststoff-Handbuch, Volume VII, Polyurethane, by Vieweg-Hochtlen, Carl-Hanser, Verlag, Munich 1966. The flame retarding substances are generally added in quantities of 1 to 20% by weight, preferably 1 to 15% by weight, based on the quantity of the polyisocyanate combinations used.

As activators there may be used for example, tertiary amines such as triethylamine, dimethylbenzylamine, tetramethylethylene diamine, N-alkylmorpholines, endoethylenepiperazine, urotropine, hexahydrotriazines such as trimethylhexahydrotriazine, 2,4,6-dimethylaminomethylphenol or organic metal salts such as tin-II acylates, e.g., tin-(II) salts of 2-ethylcaproic acid, dialkyl tin-IV acylates such as dibutyl tin dilaurate or acetyl acetonates of heavy metals such as iron.

As emulsifiers there may be used for example, hydroxyethylated phenols, higher sulphonic acids, sulphonated castor oil, hydroxyethylated castor oil, sulphonated ricinoleic acid or ammonium salts of oleic acid. Foam stabilizers such as those based on polysiloxane-polyalkylene glycol copolymers or basic silicone oils may be used. Other suitable emulsifiers, catalysts and additives are mentioned for example in "Polyurethanes, Chemistry and Technology", Volumes I and II, Saunders-Frisch, Interscience Publishers, 1962 and 1964.

The preparation of polyurethanes itself is carried out by known methods at room temperature or elevated temperatures and comprises mixing the polyisocyanate components with the compounds which contain hydrogen atoms that are reactive with isocyanate groups, if desired, with the addition of water, accelerators, emulsifiers and other auxiliary agents such as flame-retarding substances and blowing agents. Mechanical devices are advantageously used for this purpose, such as those described in French Pat. No. 1,074,713.

The reaction of the polyisocyanate with the compounds which contain at least two active hydrogen atoms including water which may be used as blowing agent is carried out with a ratio of NCO to active hydrogen of between 20 : 100 and 90 : 100 preferably between 25 : 100 and 65 : 100 since the foams obtained in this way are exceptionally hydrophilic. These ratios do not include acidic hydrogens such as those of carboxylic acid resp. sulfonic acid groups which may be present in the reaction mixture.

Foaming may be carried out either by the one shot process or by the prepolymer process. In the prepolymer process, a particular variation is available for the process according to the invention, i.e., the compounds which contain both hydrogen atoms that are reactive with isocyanate groups and ionic centers or groups capable of conversion into ionic centers may be reacted with isocyanates, using an NCO : OH ratio of between about 2:1 and 20:1, preferably from about 3:1 to about 5:1, at temperatures of from about 0° to about 100° C., preferably from about 50° to about 90° C., to produce a prepolymer which may then be foamed as a modified isocyanate component.

The foams obtained by the process according to the invention generally have a density of from about 7 to about 100 kg/m$^3$, preferably from about 10 to about 50 kg/m$^3$. The process may be varied by the known methods of polyurethane foam chemistry to produce either hard or soft, open celled or closed celled, hydrophilic or hydrophobic foams. As already mentioned above, the foams obtained by the process according to the invention are preferably used as substrates for the cultivation of plants. In that case, other nutrient salts in the form of a powdered granulate or aqueous solution may be added to the foam in addition to the ionically bound nutrient salt ions of opposite charge. While the ions of opposite charge which are ionically attached to the fixed ions are only slowly released from the foam structure into the aqueous phase by an exchange process when the plants are watered, the additional nutrient salt added to the reaction mixture is already available at the first stage of rooting since it is mainly deposited on the surface of the foam structure.

If according to a particularly preferred method of carrying out the process the foam plastics are produced using compounds which contain ionic groups in combination with ionically bound ions of opposite charge in addition to the groups which are reactive with isocyanate groups, the foam obtained is immediately ready for use, as an ion exchanger or for plant cultivation. If however, the foams contain potential ionic groups such as tertiary amino, carboxyl or sulphonic acid groups, then these must subsequently be converted into ionic groups by the addition of aqueous solutions which contain appropriate ions of opposite charge. Suitable solutions for this purpose are aqueous solutions which have a neutralizing action, such as for example, dilute acids and/or bases. Solutions of neutral salts may also be used for supplying the ions of opposite charge, provided a reaction with the acid or basic centers of the foam is insured. Thus, for example, a foam which carries sulphonic acid groups may be charged with potassium ions by means of potassium hydroxide but equally well by means of the potassium salts of acids which are weaker than organic sulphonic acids. Analogously, tertiary amino groups may be charged with solutions of magnesium nitrate or aluminum nitrate.

If suitable combinations of the mobile ions which promote and/or secure plant growth are used, vigorous development of the individual plants will take place even under extreme environmental conditions.

The foam plastics obtained by the process according to the invention are suitable in the following fields of application:
1. Plant cultivation;
2. Propagation of seedlings;
3. Planting of seeds and bulbs;
4. Physical and chemical soil improvement; and
5. Ion exchange resins.

For the propagation of seedlings and planting of seeds, the foam plastics according to the invention are preferably used in the form of cubes, rectangular blocks, strands or panels. Hydrophilic, elastic, compressed foam plastics in the form of panels, webs or mats are particularly suitable for growth from seeds. These foam plastics may be compressed with water-soluble adhesives and dried to convert them into denser products which are suitable for transport and which readily return to their initial volume when wetted with water. When this method is employed, seeds may be distributed in the form before it is compressed so that they are then fixed on the compressed foam panel by the process of compression and bonding.

For the purpose of physical and chemical soil improvement, foams are preferably used in the form of flakes or granules or cut up into small pieces. When used in this way, the foam shot only loosen and ventilate the soil as well as increasing the water storage capacity if they are hydrophilic foams with fine cells, but they also have a depot fertilizer effect by virtue of the nutrient salt ions which they contain. If desired, other synthetic and natural soil loosening substances such as peat, cellular plastics and natural waste materials such as bonemeal and leather powder and the like may be added to the foam plastics according to the invention for soil improvement.

If the foam plastics according to the invention are used alone as physical and chemical soil improvers, the foam plastics used for optimizing light, sandy soil are preferably hydrophilic with a high water retention capacity, and for optimizing heavy, poorly ventilated soil, it is preferable to use hydrophobic foam plastics. Furthermore, the foam plastics claimed according to the invention may be specifically charged with those nutrient salt ions which are lacking in the soil which is to be improved.

The foam plastics obtained by the process according to the invention may also be used as ion exchange foams for the usual ion exchange applications.

In addition, compact ion exchange materials can be produced in any size, shape, density and degree of softness from the polyurethane foams according to the invention, as well as, for example, hard or flexible ion exchange membranes.

The invention is further illustrated but it is not intended that it is to be limited by the following examples in which all parts and percentages are by weight unless otherwise indicated.

EXAMPLES

EXAMPLE 1

Preparation of a biuret polyisocyanate solution in monomeric polyisocyanates

About 20.8 parts of water are introduced dropwise with stirring in the course of about 30 minutes, at about 60° C., into about 1050 parts of a commercial isomeric mixture of tolylene diisocyanate consisting of 80 parts by weight of 1-methylbenzene-2,4-diisocyanate and 20 parts by weight of 1-methylbenzene-2,6-diisocyanate into which about 2 parts by weight of a ricinic polyglycol ether with OH number 40 have previously been stirred. The resulting precipitate goes into solution when the reaction mixture is subsequently heated to about 170° C. After maintaining the temperature at about 170° C. for about three hours, the reaction mixtures are rapidly cooled to room temperature. The resulting product has an NCO content of 33.7% and a viscosity of 3000 cP (25° C.).

EXAMPLE 2a

Preparation of a polyhydroxyl compound which contains salt groups

About 480 parts (5 mol) of 65% nitric acid followed by about 575 parts (5 mol) of 85% phosphoric acid are added dropwise at room temperature to a mixture of about 3,760 parts of propoxylated ethylene diamine (OH number 630) and about 880 parts of water. The total time required for adding the nitric acid and phosphoric acid is about 30 minutes, and the temperature rises to about 65° C. 5,690 parts of an 80% solution of the nitrate/dihydrogen phosphate salt of the propoxylated ethylene diamine in water are obtained.

EXAMPLE 2b

Process according to the invention

A mixture of about 50 parts of a compound prepared according to Example 2a and
  2 parts of a fatty acid amide polyglycol ether with OH number 35,
  2 parts of polyether siloxane (L 5310 of Union Carbide Company)
  2 parts of tin dioctoate and
  6 parts of monofluoro-trichloromethane is vigorously mixed with about 69 parts of the biuret polyisocyanate prepared according to Example 1. A hard, hydrophilic foam which has a density of about 20 kg/m$^3$ is obtained.

For the titration, about 10 grams of the foam are shred into pieces measuring about 0.5 cm$^3$ and are taken up with 1 liter of water, and normal NaOH is added portionwise with stirring. Time required for titration: 8 hours.

For titrimetric results see Curve II.

The urea contains approximately 0.45 mmol of $NO_3^-$ per g and approximately 0.45 mmol of $H_2PO_4^-$ per g.

EXAMPLE 3a

Preparation of the polyhydroxyl compound which contains salt groups

About 3760 parts (10 mol) of propoxylated ethylene diamine (OH number 630) are reacted with about 440 parts of water and about 960 parts (10 mol) of 65% nitric acid by a method analogous to that of Example 2a. About 5160 parts of an 80% aqueous solution of the corresponding seminitrate are obtained.

EXAMPLE 3b

Process according to the invention

A mixture of about 50 parts of the compound prepared according to Example 3a and
- 2 parts of fatty acid amide polyglycol ether (OH number 35),
- 2 parts of polyether siloxane (L 5310 of Union Carbide Company)
- 2 parts of tin dioctoate,
- 2.5 parts of water and
- 6 parts of monofluorochloromethane is vigorously mixed with about 68 parts of the biuret polyisocyanate prepared according to Example 1. A brittle, hydrophilic foam which has a unit weight of about 19.0 kg/m$^3$ is obtained.

For titrimetric results see Curve III. The foam contains approximately 0.9 mmol of $NO_3^-$ per g.

EXAMPLE 4a

Preparation of the polyhydroxyl compound which contains salt groups

Using a 100 liter refined steel tank with infinitely adjustable stirrer and distillation attachment, 33.12 kg (315 Val) of an anhydrous polyether (OH number 533) prepared by the addition of ethylene oxide to trimethylol propane were heated to 75° C.

14.67 kg (99 Val) of phthalic acid anhydride were introduced and the temperature was raised to 111° C. in the course of one hour. The reaction was completed by stirring at about 111° C. to 118° C. for about 2½ hours and the contents of the tank were then cooled to 43° C. Without further cooling, a solution of 5.04 kg (90 Val) of potassium hydroxide in 3.15 kg of water are added at a pressure of about 22 mm to 28 mm Hg in the course of about 2½ hours while 1166 g of water are distilled off. With the reaction temperature between 40° C. to 49° C. water is then distilled off at 14 mm Hg until the viscosity is 9,400 cP (Hoppler viscosimeter 25° C.).

52.4 kg of a colorless, almost completely clear polyester potassium salt is obtained having a water content of about 4.3%.

EXAMPLE 4b

Process according to the invention

A mixture of 50 parts of the material prepared according to Example 4a (molecular weight 584) and
- 2 parts of fatty acid amide polyglycol ether (OH number 35),
- 2 parts of polyether siloxane (L 5310 of Union Carbide Company)
- 1 part of tin dioctoate and
- 6 parts of monofluoro trichloromethane is vigorously mixed with about 17 parts of the biuret polyisocyanate prepared according to Example 1. A hydrophilic hard foam which has a density of about 28 kg/m$^3$ is obtained.

For titrimetric results see Curve IV. The foam contains approximately 1 mmol of K$^+$ per g.

EXAMPLE 5

Process according to the invention

A mixture of about 33 parts of the compound prepared according to Example 4a and
- 17 parts of the compound prepared according to Example 2a,
- 3 parts of fatty acid amide polyglycol ether (OH number 35)
- 4 parts of polyether siloxane
- 1 part of tin dioctoate and
- 10 parts of monofluoro-trichloromethane is vigorously mixed with about 48 parts of the biuret polyisocyanate prepared according to Example 1. A hydrophilic hard foam which has a density of about 14.0 kg/m$^3$ is obtained.

For titrimetric results see Curve I. The foam contains approximately 0.3 mmol of K$^+$ per g;
0.08 mmol of $NO_3^-$ per g; and
0.08 mmol of $H_2PO_4^-$ per g.

EXAMPLE 6

About 480 parts (5 mol) of 65% nitric acid followed by about 575 parts (5 mol) of 85% phosphoric acid are added dropwise to a mixture of about 2,850 parts of propoxylated triisopropanolamine (OH number 590) and about 675 parts of water at room temperature. An exothermic reaction takes place, yielding about 4,580 parts of an 80% solution of a 1:1 mixture of the corresponding nitrate and dihydrogen phosphate in water.

EXAMPLES 7–9

| Example | Parts of Tert. Amino-triol from Ex. 6 | Water, Parts | Mineral Acid, Parts | | Product | Solids Content, % |
| --- | --- | --- | --- | --- | --- | --- |
| 7 | 2850 | 280 | 960 | 65% NHO$_3$ | Nitrate | 90 |
| 8 | 2850 | 500 | 1150 | 85% H$_3$PO$_4$ | Dihydrogen Phosphate | 85 |
| 9 | 2850 | 500 | 570 | 85% H$_3$PO$_4$ | Hydrogen Phosphate | 86.5 |

The method of carrying out Examples 7 to 9 is analogous to the method used in Example 6.

EXAMPLES 10 – 13

The procedure is the same as described in Example 6 but using alkoxylated ethylenediamine (mixture of 43% of ethylene oxide and 57% of propylene oxide) with OH number 649 in place of the propoxylated triisopropanolamine.

| Example | Alkoxylated Ethylene Diamine, Parts | Water, Parts | Mineral Acid, Parts | | Product | Solids Content, % |
| --- | --- | --- | --- | --- | --- | --- |
| 10 | 3450 | 620 | 1150 | 85% H$_3$PO$_4$ | Bis-Hydrogen Phosphate | 85 |

| Example | Alkoxylated Ethylene Diamine, Parts | Water, Parts | Mineral Acid, Parts | | Product | Solids Content, % |
|---|---|---|---|---|---|---|
| 11 | 3450 | 625 | 575 | 85% $H_3PO_4$ | Mono-hydrogen Phosphate | 85 |
| 12 | 3450 | 160 | 1920 | 65% $HNO_3$ | Dinitrate | 85 |
| 13 | 3450 | 80 | 960 | 65% $HNO_3$ + | Nitrate Dihydrogen Phosphate | 90 |
|  |  |  | 580 | 85% $H_3PO_4$ |  |  |

All the yields are quantitative and all the salts can be diluted with any proportion of water to form true solutions.

The polyhydroxyl compounds prepared according to Examples 6 to 13, which contain salt type groups, may be worked up into foam plastics in a manner analogous to Examples 2 and 3.

EXAMPLE 14

To a polyol mixture consisting of:
10 parts of a polyether with OH number 649 which is initiated on ethylene diamine and contains 50% of propylene oxide units and 50% of ethylene oxide units;
25 parts of a polyethylene-polyether with OH number 500 which is started on TMP/sucrose;
10 parts of a polyether with OH number 42 which is prepared by reacting a mixture of trimethylolpropane and propylene glycol (proportion by weight 1:1) with a mixture of 80 parts by weight of propylene oxide and 20 parts by weight of ethylene oxide, and
10 parts of polyethylene glycol having a molecular weight of 600; is added
20 parts of a 50% aqueous solution of the potassium salt of aminoacetic acid;
2 parts of polyether polysiloxane;
2 parts of a fatty acid amide polyglycol ether with OH number 40; and
5 parts of monofluoro-trichloromethane; and is vigorously mixed with about 68 parts of the biuret polyisocyanate prepared in Example 1. A tough, hydrophilic foam which has a density of about 51.5 kg/m³ is obtained. It contains approximately 0.6 mmol of $K^+$ per g.

EXAMPLE 15

A mixture of
55 parts of the polyol mixture specified in Example 14;
20 parts of a 45% aqueous solution of the potassium salt of aminosulphonic acid;
2 parts of polyether polysiloxane (L 5310 of Union Carbide Company);
2 parts of a fatty acid amide polyglycol ether with OH number 40; and
5 parts of monofluoro trichloromethane is vigorously mixed with about 68 parts of the biuret polyisocyanate prepared as described in Example 1. A tough, hydrophobic foam which has a density of about 30.0 kg/m³ is obtained. It contains approximately 0.7 mmol of $K^+$ per g.

EXAMPLE 16

A mixture of
55 parts of the polyol mixture specified in Example 14;
20 parts of a 50% aqueous solution of the potassium salt of α-dimethylolpropionic acid;
2 parts of polyether polysiloxane (L 5310 of Union Carbide Company);
2 parts of fatty acid amide polyglycol ether with OH number 40; and
5 parts of monofluoro trichloromethane is vigorously mixed with about 68 parts of the biuret polyisocyanate prepared as described in Example 1. A hydrophilic hard foam which has a density of about 22 kg/m³ is obtained. It contains approximately 0.45 mmol of $K^+$ per g.

EXAMPLE 17

A mixture of
55 parts of the polyol mixture specified in Example 14;
20 parts of a 25% aqueous solution of the dipotassium salt of tartaric acid;
2 parts of polyether polysiloxane (L 5310 of Union Carbide Company);
2 parts of a fatty acid amide polyglycol ether with OH number 40; and
5 parts of monofluoro-trichloromethane is vigorously mixed with about 68 parts of the biuret polyisocyanate prepared as described in Example 1. A slightly hydrophilic hard foam which has a density of about 18.5 kg/m³ is obtained. It contains approximately 0.75 mmol of $K^+$ per g.

EXAMPLE 18

A mixture of
55 parts of the polyol mixture specified in Example 14;
20 parts of a 50% aqueous solution of the sodium salt of β-hydroxyethane sulphonic acid;
2 parts of polyether polysiloxane (L 5310 of Union Carbide Company);
2 parts of a fatty acid amide polyglycol ether with OH number 40; and
5 parts of monofluoro-trichloromethane is vigorously mixed with about 63 parts of the biuret polyisocyanate prepared as described in Example 1. A hydrophilic foam which has a density of about 23.5 kg/m³ is obtained. It contains approximately 0.5 mmol of $K^+$ per g.

EXAMPLE 19

A mixture of
55 parts of the polyol mixture specified in Example 14;
15 parts of a 30% aqueous solution of the potassium salt of p-hydroxybenzoic acid;

2 parts of polyether polysiloxane (L 5310 of Union Carbide Company);

2 parts of a fatty acid amide polyglycol ether with OH number 40; and 5 parts of monofluorotrichloromethane is vigorously mixed with about 68 parts of the biuret polyisocyanate prepared as described in Example 1. A tough and brittle hydrophilic foam which has a density of about 24 kg/m$^3$ is obtained. It contains approximately 0.3 mmol of K$^+$ per g.

In Titration Curves I to IV:
– – – – – – – – – – Without ion exchanger.
——————— With ion exchanger.

Although the invention is illustrated in considerable detail in the foregoing Examples, it is to be understood that such Examples are presented solely for purposes of illustration and that many variations may be made therein by those skilled in the art without departing from the spirit and scope of the invention.

What is claimed is:

1. In a process for the production of polyurethane foam plastics by process which comprises reacting (a) an organic polyisocyanate with (b) organic compound containing active hydrogen containing atoms reactive with -NCO groups and fixed ionic groups in the presence of a blowing agent, the improvement which comprises employing 5-100% by weight of the total weight of (b) of a mixture of both:
    1. compounds which contain fixed cationic groups and the corresponding mobile anionic groups associated with said fixed groups selected from the group consisting of salts of polyester polyols containing carboxyl or sulphonic acid groups with a molecular weight below about 1500, reaction products of higher functional alcohols which have a molecular weight of up to about 250 with aliphatic or aromatic dicarboxylic acid anhydrides, and polyether esters which contain hydroxyl groups and have a molecular weight of less than 1500 obtained by reacting an alkoxylated higher valent alcohols with aliphatic or aromatic dicarboxylic anhydrides, and
    2. compounds which contain fixed anionic groups and the corresponding mobile cationic groups associated with said fixed groups which are salts of hydroxyl polyethers which contain tertiary amino groups and have a molecular weight below about 1500 obtained by reacting alkylene oxides with primary or secondary amines or amino alcohol.

* * * * *